United States Patent Office 3,579,476
Patented May 18, 1971

3,579,476
GLASS FILLED GRAFT COPOLYMERS OF AN OLEFIN AND AN UNSATURATED ACID
James K. Rieke and Frank H. Justin, Midland, Mich., assignors to Dow Chemical Company, Midland, Mich.
No Drawing. Continuation-in-part of application Ser. No. 531,381, Mar. 3, 1966. This application Feb. 14, 1969, Ser. No. 799,487
Int. Cl. C08f 45/10
U.S. Cl. 260—41          11 Claims

ABSTRACT OF THE DISCLOSURE

Polymer compositions having improved tensile properties and improved impact resistance comprising a blend of between about 10 and about 40 weight percent glass fibers and between about 60 and about 90 weight percent of a graft copolymer of an olefin such as ethylene and an ethylenically unsaturated carboxylic acid such as acrylic acid. The polymer compositions can be molded or extruded to produce useful articles of manufacture including gears, sprockets, washing machine agitators, gear housings, and the like.

---

This application is a continuation-in-part of copending application Ser. No. 531,381 filed Mar. 3, 1966, now abandoned.

This invention relates to glass filled polymers. In one aspect, this invention relates to polymer materials having improved physical properties. In another aspect, this invention relates to glass filled copolymers which can be molded or otherwise formed into useful articles of manufacture having superior physical properties.

It is well known in the art that the mechanical properties of polyolefin resins such as polystyrene and polyethylene can be improved by the addition of glass fibers. In particular, the tensile strength of polyethylene is improved by the addition of glass fibers. The impact strength, however, of polyethylene having glass fibers as a filler is less than the impact strength of the polyethylene alone. Polyethylene having glass fibers as a filler is therefore especially suited for the production of molded articles which require good tensile strength but where impact strength is not an important consideration. Since many articles of manufacture require good impact strength as well as good tensile strength, it is desirable to have available a resin which satisfies both of these requirements.

The amount of glass fibers necessary as a filler in a polyolefin resin to achieve a material increase in the mechanical properties of the polyolefin is often greater than 35 weight percent. This amount of glass fibers increases the cost of the resin significantly. Accordingly, efforts are continually being made to achieve the desired mechanical properties of glass filled polyolefin with the use of less glass filler material.

According to this invention, these and other disadvantages of the glass filled polyolefins of the prior art are overcome by a composition of matter comprising a blend of glass fibers and a graft copolymer of an olefin and an unsaturated acid. The blends of this invention have improved mechanical properties in terms of high yield tensile strength, high impact resistance, and excellent retention of yield tensile strength after exposure to water. In general, the excellent mechanical properties of the blends of this invention are achieved with less glass filler material than that required to achieve a significant increase in the mechanical properties of polyethylene or the like. This aspect makes the blends of this invention more attractive from an economic standpoint because the cost of the glass filler material in a particular blend is less.

Accordingly, it is an object of this invention to provide a composition of matter having improved physical and mechanical properties.

Another object of this invention is to provide a composition of matter having improved yield tensile strength, improved impact resistance, and better retention of yield tensile strength after exposure to water.

A further object of this invention is to provide a composition of matter having improved physical and mechanical properties at a cost substantially less than the cost of similar compositions.

These and other objects of the invention will become apparent to one skilled in the art after studying the following detailed description and the appended claims.

The compositions of this invention which have improved mechanical and physical properties comprise a blend of between about 10 and about 40 weight percent glass fibers and between about 60 and about 90 weight percent graft copolymer of an olefin and an ethylenically unsaturated carboxylic acid which can be grafted on to polymer chains of the olefin. A specific composition of matter within the scope of the compositions of this invention consists essentially of from about 40 to about 15 percent by weight glass fibers and from about 60 to about 85 percent by weight of a graft copolymer of (a) a polymer of an olefin containing from 2 to 3 carbon atoms per molecule and (b) an $\alpha,\beta$-monoethylenically unsaturated monocarboxylic acid which can be grafted on to polymer chains of (a). The olefin polymer is generally present in the graft copolymer in an amount equal to at least about 80 percent by weight of the copolymer. Preferably, the graft copolymers used in preparing the composition of the invention contain between about 86 and about 97 weight percent polyolefin and between about 3 and about 14 weight percent ethylenically unsaturated acid.

The graft copolymers which are blended with the glass fibers to produce the improved compositions of this invention can be obtained commercially or they can be prepared by any one of several processes well known in the art. For example, the graft copolymers can be obtained by exposing a solution or a finely divided powder of the polyolefin to ionizing radiation in the presence of the unsaturated acid. In another method, the polyolefin, in solution or in a finely divided form, is contacted with a solution of the unsaturated acid and a peroxide. U.S. Pat. 3,177,269 illustrates one method for preparing graft copolymers which can be blended with glass fibers to produce the compositions of this invention. The teachings of Pat. 3,177,269 are specifically incorporated herein by reference. The graft copolymers can also be prepared by the technique described in U.S. Pat. 3,270,090, the disclosure of which is specifically incorporated herein by reference.

The copolymer can be mixed with the glass fibers in any physical form but it is preferred that the polymer be in powder form with a particle size of less than about 30 mesh, with the understanding that granules may also be utilized.

Glass fibers of any suitable size and shape can be employed in preparing the compositions of the invention. As a general proposition, the glass fibers have a diameter of between about 0.0001 and about 0.0008 inch and preferably between about 0.0003 and about 0.0004 inch. The length of the glass fibers should be less than about 1.5 inches and preferably less than 0.5 inch but still in the form of fibers.

Any of a wide variety of methods known in the art can be utilized for preparing blends of the glass fibers and the copolymer. Such methods include contacting the fiber with a hot melt of the copolymer or dry blending a chopped roving, staple fiber or filament in a dry blending apparatus together with an appropriate quantity of finely divided particulate copolymer.

An illustrative method which can be employed to prepare the compositions of this invention is described in copending application Ser. No. 532,819 of James L. Amos, Arnett L. Bird and Robert P. Snyder filed Jan. 7, 1966, the teachings of which are specifically incorporated herein by reference.

Olefins which can be polymerized to produce polymer chains susceptible to grafting with the unsaturated acids include ethylene and propylene. Polymers of these two olefins can be obtained commercially or they can be produced by any one of a number of processes well known in the polymerization art.

The ethylenically unsaturated carboxylic acids which are grafted on to the polyolefin chains to produce the graft copolymers useful in preparing the compositions of this invention are any suitable mono or polycarboxylic monoethylenically unsaturated acid having between 3 and 8 carbon atoms per molecule. It is generally preferred that the acid monomers be unsaturated in the $\alpha,\beta$ position on the molecule.

Exemplary ethylenically unsaturated carboxylic acids which can be grafted on to the polyolefin chains include acrylic acid, methacrylic acid, crotonic acid, isocrotonic acid, maleic acid, and the like. Mixtures of two or more of the above-identified acids can be grafted on to the polyolefin if desired. While results have indicated that maleic acid does not become attached to the polyolefin chains as easily as does acrylic acid or methacrylic acid, when maleic acid is mixed with acrylic acid and this mixture then blended with the polyolefin under graft polymerization conditions the maleic acid monomers become attached to the polyolefin chains at a higher rate than when maleic acid is used alone.

Maleic anhydride can be mixed with styrene and this mixture then blended with the polyolefin under graft polymerization conditions such that maleic anhydride and styrene monomers become grafted on to the polyolefin chains as copolymer side chains. The resulting graft polymer can then be treated with water or caustic to convert the anhydride groups to dicarboxylic acid groups by well known methods.

The polymer compositions of this invention can be fabricated into a multitude of different articles having utility in a variety of fields where the mechanical and physical properties of the articles are important considerations. For example, the polymer compositions of this invention can be molded or extruded into a variety of useful articles including gears, sprockets, washing machine agitators, gear housings, terminal blocks in electrical systems, and the like.

The following examples illustrate the improved properties of the compositions of the invention. It is to be understood, however, that these examples are for the purpose of illustration only and the invention is not to be regarded as limited to any of the specific materials or conditions recited herein.

EXAMPLE 1

A graft copolymer containing about 95.4 weight percent combined polyethylene and about 4.6 weight percent combined acrylic acid was prepared by the technique described in Pat. 3,270,090. The graft copolymer in powder form was blended with glass fibers by tumbling the copolymer and the fibers in a cylindrical container rotated on two powered rolls. The glass fibers had an average diameter ranging between about 0.0003 and about 0.0004 inch and an average length of about 0.25 inch. The glass fibers were employed in varying amounts to produce several blends each containing 10, 20, and 30 weight percent glass. A portion of each of the resulting blends was charged to a compression molding apparatus and several test bars measuring about 1 inch by 6 inches were produced by subjecting each portion to a pressure of about 30 tons for 3 minutes at a temperature of about 360° F. Some of the test bars were tested for yield tensile strength according to test procedures outlined by ASTM D 638–56T. Other test bars were tested for notched Izod impact strength according to test procedure ASTM D 256–56 (Method A). The results of these tests are reported in Table I below.

For purposes of control, to illustrate the improved results obtained with the compositions of this invention, several additional test bars were made and tested according to the procedure outlined above from polyethylene without any glass fibers and from polyethylene containing 10, 20, and 30 weight percent glass fibers, based upon the total weight of the polyethylene and glass fibers. The polyethylene used in making the test bars was the same type as that used as a starting material for preparing the graft copolymer tested. Another control run was made using the graft copolymer described above without any glass fibers. The results of these tests are also reported in Table I below.

TABLE I

| Percent glass | Yield tensile strength (p.s.i.) | | | | Notched Izod impact strength (ft.-lb./in. of notch) | | | |
|---|---|---|---|---|---|---|---|---|
| | 0 | 10 | 20 | 30 | 0 | 10 | 20 | 30 |
| Polyethylene | 3,900 | 5,100 | 6,800 | 8,400 | 2.6 | 2.1 | 1.3 | 1.2 |
| Graft copolymer | 3,700 | 6,800 | 9,400 | 10,800 | 1.4 | 1.4 | 1.6 | 1.9 |

From the data reported in Table I, it can be seen that the yield tensile strength increases 3100 p.s.i. when the graft copolymer contains 10 weight percent glass fibers (as compared to an increased of only 1200 p.s.i. for polyethylene with the same amount of glass), 5700 p.s.i. when the graft copolymer contains 20 weight percent glass fibers (as compared to an increase of only 2900 p.s.i. for polyethylene with the same amount of glass), and 7100 p.s.i. when the graft copolymer contains 30 weight percent glass fibers (as compared to an increase of only 4500 p.s.i. for polyethylene with the same amount of glass).

The improvement in impact strength with the compositions of this invention is even more significant. As evidenced by the data in Table I, the impact strength of the graft copolymer is improved significantly with the addition of glass fibers whereas the glass fibers have a deleterious effect on the impact strength of polyethylene inasmuch as the impact strength of the polyethylene decreases with increasing amounts of glass fibers.

EXAMPLE II

Another group of test bars was prepared by the technique described in Example I and tested to determine the ability of the compositions to retain their yield tensile strength after exposure to water. These test bars were made of polyethylene without glass and from polyethylene with varying amounts of glass fibers. Another set of test bars was made of the graft copolymer without glass and with varying amounts of glass fibers. The polyethylene, graft copolymer, and glass fibers used were the same types as those described in Example I. In these runs, the several test bars were submerged for about 18 hours in a tank containing water at a temperature of about 70° F. The bars were then removed from the tank and their yield tensile strength determined by ASTM D 638–56T. The results of these tests are reported in Table II below. The figures in parentheses in Table II represent the yield tensile strength of the test bars exposed to water as a percentage of the yield tensile strength for test bars not exposed to water. These percentages thus indicate the ability of the compositions to retain yield tensile strength after exposure to water.

TABLE II

| Percent glass | Yield tensile strength (p.s.i.) | | | |
|---|---|---|---|---|
| | 0 | 10 | 20 | 30 |
| Polyethylene | 4,000 (101) | 4,600 (90) | 5,300 (78) | 6,400 (76) |
| Graft copolymer | 3,700 (100) | 6,300 (93) | 8,400 (90) | 10,100 (94) |

From the data in Table II, it is clear that the compositions of this invention are much more resistant to the effects of water than is a blend of polyethylene and glass fibers. The compositions of this invention are thus particularly suitable for use in fabricating machine parts and other articles which are subjected to moisture.

EXAMPLE III

Several test bars were fabricated by injection molding a graft copolymer of polyethylene containing about 8 percent by weight combined acrylic acid. The graft copolymer had a density of about 0.95 and a melt index of about 4. Some of the test bars were made from the graft copolymer without any glass fibers and others were made from a blend of the graft copolymer with varying amounts of glass fibers. One series of test bars was made from the graft copolymer in powder form. Another series of test bars was made from the graft copolymer in granule form. The glass fibers were made from a roving chopped to obtain fibers about 0.25 inch long. The glass fibers were introduced into an Ankerwerke screw injection machine at a rate of between about 2 and about 2.5 pounds per hour and the copolymer was introduced at a rate of between about 7.5 and about 8 pounds per hour. The time for each cycle of injection molding to produce the test bars was about 42 seconds.

Screw speed of the machine was about 129 r.p.m. and cylinder temperature was about 445° F. The test bars were made at an injection pressure of about 9000 p.s.i.

The test bars were tested for yield tensile strength and unnotched Izod impact strength according to the ASTM procedures outlined in Example I except unnotched test bars were used to determine impact strength. The results of these tests are reported in Table III below.

TABLE III

| Run No. | Glass fibers (percent by weight) | Yield tensile strength (p.s.i.) | Unnotched Izod impact strength (ft.-lbs.) |
|---|---|---|---|
| Control 1 [1] | 0 | 3,924 | >15 |
| 1 [1] | 20 | 5,098 | 5.54 |
| 2 [1] | 30 | 6,726 | 6.76 |
| 3 [1] | 40 | 8,044 | 8.25 |
| Control 2 [2] | 0 | 3,924 | >15 |
| 4 [2] | 30 | 11,510 | 12.4 |

[1] Copolymer in granule form.
[2] Copolymer in powder form.

The data in Table III above illustrate the improvement in yield tensile strength when glass fibers are blended with the graft copolymer to produce the compositions of this invention. While the unnotched Izod impact strength appears to be less when glass fibers are blended with the graft copolymer, the graft copolymer alone without any glass fibers was actually too ductile to obtain a meaningful measurement of this property.

EXAMPLE IV

Several test bars were made by the procedure outlined in Example III using a graft copolymer of polypropylene and acrylic acid containing about 13 percent by weight combined acrylic acid. The test bars were tested for yield tensile strength and unnotched Izod impact strength by the technique used in Example III. The results of these tests are reported in Table IV below.

TABLE IV

| Run No. | Glass fibers (percent by weight) | Yield tensile strength (p.s.i.) | Unnotched Izod impact strength (ft.-lbs.) |
|---|---|---|---|
| Control 1 [1] | 0 | 4,360 | 0.5 |
| 1 [1] | 30 | 8,526 | 2.01 |
| 2 [2] | 30 | 11,322 | 1.64 |

[1] Copolymer in granule form.
[2] Copolymer in powder form.

From the data in Table IV, it is evident that the physical properties of a graft copolymer of polypropylene and acrylic acid are improved substantially with the addition of glass fibers.

EXAMPLE V

Several sets of test bars are fabricated by the technique described in Example I using graft copolymers of polyethylene and methacrylic acid, polyethylene and crotonic acid, polyethylene and isocrotonic acid, and polyethylene and maleic acid. Each of the compositions of these test bars contains about 92 weight percent polyethylene and about 8 weight percent combined acid. The test bars have improved physical and mechanical properties thus indicating the advantages obtained by the compositions of this invention.

Although the invention has been described in considerable detail, it must be understood that such description is for the purpose of illustration only and should not be construed as limiting of the invention.

What is claimed is:

1. A composition of matter having improved tensile properties and impact resistance comprising a blend of between about 10 and about 40 weight percent glass fibers and between about 60 and about 90 weight percent graft copolymer of an olefin selected from the group consisting of ethylene and propylene and an ethylenically unsaturated monocarboxylic acid having between 3 and 8 carbon atoms per molecule, said olefin being present in said graft copolymer in an amount equal to at least about 80 percent by weight of said graft copolymer.

2. A composition of matter according to claim 1 wherein said olefin is ethylene and said ethylenically unsaturated monocarboxylic acid is selected from the group consisting of acrylic acid, methacrylic acid, crotonic acid, and isocrotonic acid.

3. A composition of matter according to claim 1 wherein said olefin is ethylene and said ethylenically unsaturated monocarboxylic acid is acrylic acid.

4. A composition of matter according to claim 1 wherein said olefin is ethylene and said ethylenically unsaturated monocarboxylic acid is methacrylic acid.

5. A composition of matter according to claim 1 wherein said olefin is ethlyene and said ethylenically unsaturated monocarboxylic acid is crotonic acid.

6. A composition of matter according to claim 1 wherein said olefin is ethylene and said ethlyenically unsaturated monocarboxylic acid is isocrotonic acid.

7. A composition of matter according to claim 1 wherein said olefin is ethylene.

8. A composition of matter according to claim 1 wherein said olefin is propylene and said ethylenically unsaturated monocarboxylic acid is acrylic acid.

9. A composition of matter having improved tensile properties and impact resistance, said composition consisting essentially of from about 40 to about 15 percent by weight glass fibers and from about 60 to about 85 percent by weight of a graft copolymer of (a) an olefin containing from 2 to 3 carbon atoms and (b) acrylic acid, said olefin being present in said copolymer in an amount equal to at least about 80 percent by weight of said copolymer.

10. The composition according to claim 9 wherein the olefin is ethylene.

11. The composition according to claim 9 wherein the olefin is proplyene.

References Cited

UNITED STATES PATENTS

| | | | |
|---|---|---|---|
| 3,013,915 | 12/1961 | Morgan | 260—41AG |
| 3,164,563 | 1/1965 | Maxwell et al. | 260—41AG |
| 3,272,771 | 9/1966 | Busche et al. | 260—88.1 |
| 3,416,990 | 12/1968 | Robinson, Jr. | 260—878 |
| 3,375,219 | 3/1968 | Robb | 260—41 |
| 3,396,142 | 8/1968 | Little | 260—41 |
| 3,290,415 | 12/1966 | Tanner | 260—878 |

FOREIGN PATENTS 942,789  11/1963  Great Britain.

MORRIS LIEBMAN, Primary Examiner

S. L. FOX, Assistant Examiner